Figure 1:
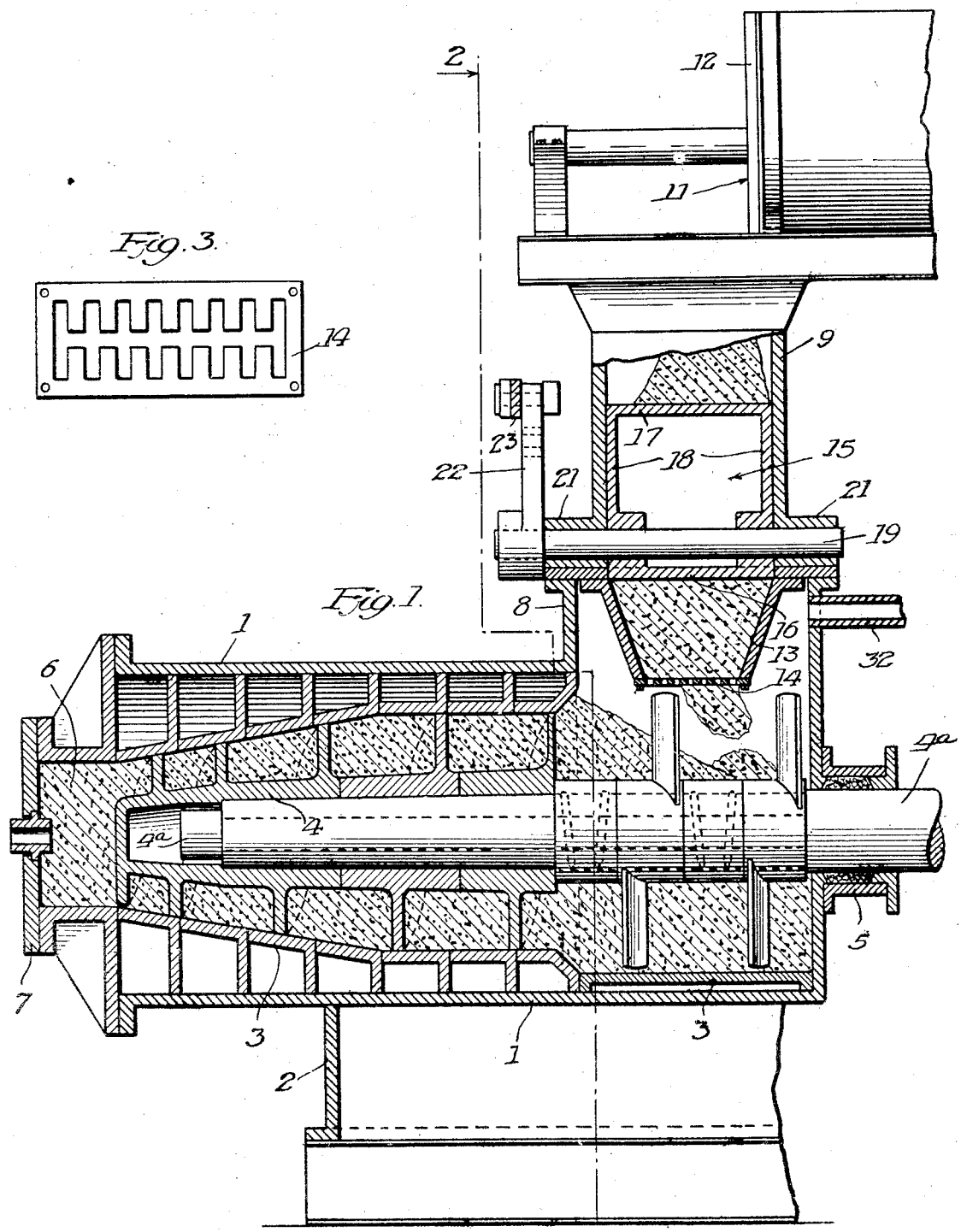

Feb. 21, 1933. T. F. MOONEY 1,898,381
METHOD AND MACHINE FOR EXTRUDING PLASTICS
Filed Nov. 23, 1932 2 Sheets-Sheet 1

Patented Feb. 21, 1933

1,898,381

UNITED STATES PATENT OFFICE

THOMAS F. MOONEY, OF NEW LEXINGTON, OHIO, ASSIGNOR TO LUDOWICI-CELADON COMPANY, OF CHICAGO, ILLINOIS, A CORPORATION OF ILLINOIS

METHOD AND MACHINE FOR EXTRUDING PLASTICS

Application filed November 23, 1932. Serial No. 644,123.

This invention relates to the treatment of plastic materials such as clay and/or shale and the like while extruding the same from an auger machine.

It has been the practice to extrude plastic materials such as shale or clay from auger machines in a rectangular or suitably shaped column which is later cut up into suitable lengths for tiles, for instance, and while pug mills and auger machines for treating and extruding plastic materials have been generally accepted as the most practical machines for making ceramic articles such as tile, they are known to have certain defects. One of the most common of these defects is the inclusion of air in a column of plastic material which not only affects the interior structure of the body of column of material but also affects the surface thereof.

Attempts have been made to overcome this defect by removing as much of the air as possible from the material while in the process of preparation within the extrusion machine to improve the character of the material extruded therefrom which thereby not only has a higher and more uniform density but a more desirable surface. In conformity with this idea, attempts have been made to extract air from certain portions of the pug mill and/or from the auger machine. In the handling of wet plastic materials it is preferable to deaerate the material while in the wet state and it has been found more advantageous to extract the air in the auger machine as distinguished from the pug mill. Evacuating in the auger machine, however, presents certain further difficulties as it is in this machine that the plastic material is compacted into dense form and extruded. The difficulties encountered arise in feeding the plastic material into the auger machine or the vacuum chamber thereof for deaerating in such a manner as to maintain a hermetic seal and permit extraction of the air and yet prevent piling up of the plastic material in the vacuum chamber.

In accordance with this invention a positive and readily controlled or regulatable intermediate feed is provided for feeding the plastic material into the evacuating chamber of the auger machine in a rather granular condition or state so that the plastic material is not compressed into such a tight mass that it is impossible to evacuate the air, but in sufficiently dense condition that the clay will form a seal. The feed is maintained under such positive and accurate control as to prevent piling up of the material in the evacuating chamber.

Figure 2:
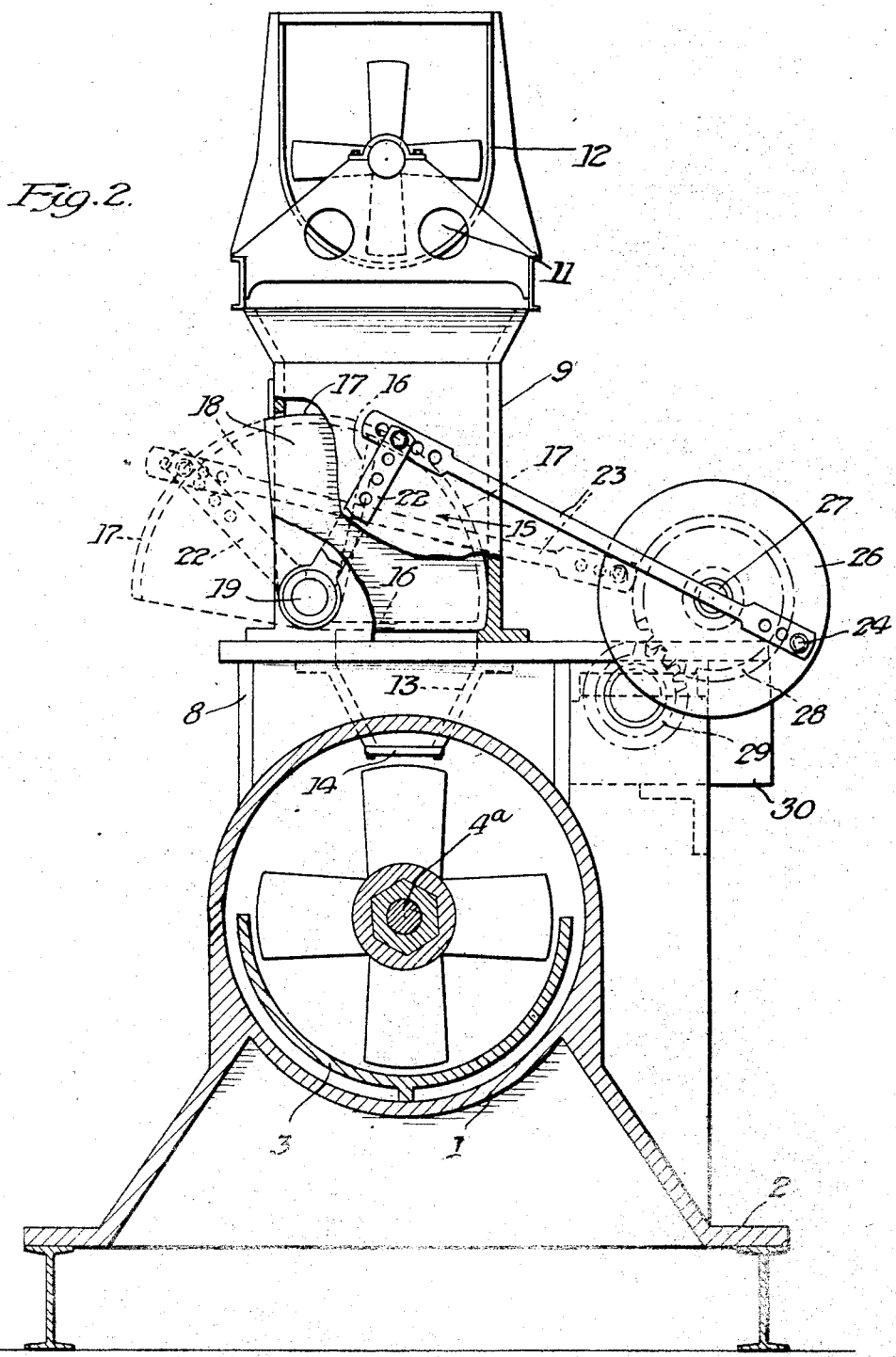

A more complete understanding will be obtained from the following description given in connection with the drawings in which:

Fig. 1 is a vertical longitudinal section taken through approximately the center of an extrusion machine constructed in accordance with this invention, Fig. 2 is a transverse vertical section taken on line 2—2 of Fig. 1, and Fig. 3 is a plan view of a plate which may be used at the outlet of the intermediate feed, if desired.

As can be seen from the drawings, the auger machine comprises a drum or barrel 1 mounted upon a suitable support 2. The drum is provided with an inner lining 3 which defines an inner cylindrical barrel-like chamber terminating at one end in a frusto conical end within which is mounted the auger 4 carried upon an auger shaft 4a. The auger shaft extends through the rear end of the drum through a suitable bearing and packing box 5 and may be driven by any suitable means, not shown. The discharge end of the barrel terminates in a die chamber 6 beyond the auger to the outer end of which is attached a die plate 7, in the usual manner. Adjacent its rear end drum 1 is provided with an inlet hopper 8.

To insure positive and controlled feed of the plastic material from the pug mill into the auger machine, an intermediate feeding device is employed which positively forces the plastic material into the auger inlet. The intermediate feed comprises a hopper 9 which receives plastic material from the outlet 11 of the pug mill 12 and terminates at its lower end in a mouthpiece 13 arranged to discharge into the inlet 8. If desired, a plate 14 may be secured to the bottom of mouthpiece 13.

In the illustrated machine, plate 14 has a single opening in the form of an irregularly slotted aperture therethrough although any other configuration of a single opening desired may be employed to meet the particular circumstances encountered.

An oscillating plunger 15 which approximates a quarter circle segment having an imperforate bottom wall 16, an arcuate end wall 17 extending approximately 90° and two side walls 18, is fitted snugly within hopper 9. The plunger is fixedly secured to a rock shaft 19 extending through the hopper and journalled in bearings 21 formed integrally with the side walls of the hopper.

Secured to one end of shaft 19 is a crank arm 22 to the outer end of which is adjustably secured one end of a connecting rod 23. The other end of rod 23 is adjustably connected to a crank pin 24 attached to a crank disc 26 secured to shaft 27 which may be rotated through a pair of gears 28 and 29, the latter of which is driven from any suitable variable speed drive 30. Both arm 22 and rod 23 are provided with a plurality of openings in their ends thus permitting adjustment of the length of the arm and rod and which, in combination with the variable speed drive, permits both the amplitude and speed of oscillations of the plunger to be accurately adjusted and controlled.

To evacuate the air contained within the plastic material as it is discharged through mouth 13 in ganulated form, a suction or partial vacuum is created in the rear end or evacuation chamber of the drum. For this purpose a suction line 32 is connected to inlet 8 which, with the rear end of the drum, constitutes a vacuum or evacuation chamber or zone sealed at one end by the plastic material within mouth 13 and at the other end by the plastic material in die chamber 6.

In operation the plastic material discharged from outlet 11 of pug mill 12 will fall into the upper part of hopper 9 above plunger 15. During the period when plunger 15 is in retracted or open position, which period and position may be adjusted, plastic material will fall into the lower portion of hopper 9 and upon closing of plunger 15 will be compressed in the lower portion of hopper 9 and forced into mouth 13 and finally forced through the open end of 13 against the resistance caused by the reduction of size of the opening and by the plate 14, if used. This resistance is preferably only sufficient to cause the plastic material to compact to a density sufficient to form a hermetic seal and yet permit the material to discharge through the mouth 13 in more or less granular form, i. e., the density in mouth 13 will be less than in the die chamber 6 where the material is compacted to greater density by the auger.

The speed and amplitude of the reciprocations of plunger 15 can be and are so adjusted and controlled to feed the material into the evacuation chamber against the resistance offered by mouthpiece 13 and with relation to the amount of material being discharged from the pug mill, and with relation to the speed of the auger shaft 4a as to maintain a hermetic seal by the plastic material itself in mouthpiece 13 and yet maintain the density low enough that the material falls in chunks or lumps through the mouthpiece upon the rear blades carried by the auger shaft. These blades tend to further break up the lumps of plastic material falling from mouthpiece 13 and further expose the air cells in the plastic material to permit of more complete evacuation of air.

It will be obvious from the foregoing that the difficulties of the usual machines are overcome by the positive and yet accurately controllable intermediate feeding device disposed between the plug mill and auger machine which so feeds the plastic material into the extrusion machine that it will itself form a hermetic seal in the mouthpiece 13 and yet not compress the plastic material to such an extent as to prevent deaerating.

It has been found that by a proper control and adjustment of the intermediate feed the plastic material can be retained in a semi-granular or sufficiently open state to permit practically complete extraction of the air from the plastic material while in the vacuum chamber. The granular form in which the material is fed into the evacuation chamber is far superior to a stream formation of a plurality of compact or dense streams and requires far less driving power.

The speed of the auger is, of course, so regulated as to maintain compression of the plastic material in die chamber 6 and regulated relatively to the intermediate feed to prevent backing or piling up of the plastic material in the vacuum chamber. The entire mechanism is completely adjustable to compensate for variations in character of material, operating speeds and operating conditions in general. The mechanism is simple, requires a minimum amount of parts and power to operate and also a minimum change to existing machines.

It will be apparent to those skilled in the art that various changes may be made in the details of construction without departing from the spirit and scope of this invention as defined in the following claims.

I claim:

1. The combination with an auger machine comprising a barrel, an auger journaled for rotation therein and a suction connection into said auger machine for evacuating material therein, of a feeding mechanism arranged to receive plastic material and discharge it into the inlet of said auger machine, said feeding mechanism including means for feeding and compacting the material in the discharge side thereof sufficiently to maintain a hermetic seal by the plastic material while feeding the plastic material through said seal into the auger machine, means for positively driving said feeding and compacting means and means for controlling said driving means to prevent the material from being compacted to a density which cannot be evacuated in said auger mill.

2. The combination with an auger machine, comprising a barrel, an auger journaled for rotation therein and a suction connection into said auger machine, of a feeding mechanism arranged to receive plastic material and discharge it into the inlet of said auger machine, said intermediate feeding mechanism including an oscillating plunger for feeding and compacting the material in the discharge side thereof sufficiently to maintain a hermetic seal by the plastic material while feeding the plastic material through said seal into the auger machine, and means for partially breaking up the material as it enters the auger machine to allow evacuation of air from said plastic material.

3. The combination with an auger machine comprising a barrel and an auger journaled for rotation therein and a suction connection into said auger machine, of a feeding mechanism arranged to receive plastic material and discharge it into the inlet of said auger machine, said feeding mechanism including means for feeding and compacting the material in the discharge side thereof sufficiently to maintain a hermetic seal by the plastic material while feeding the plastic material through said seal into the auger machine, and means partially breaking up the material as it enters the auger machine to allow evacuation of air from said plastic material, said means comprising a plate having a slotted aperture forming the inlet to said auger machine.

4. The combination with a pug mill for working plastic material and an auger machine comprising a barrel having a die chamber at one end and an auger journaled for rotation therein and arranged to receive and extrude the plastic material pugged by said mill through said die chamber, a portion of said auger machine being hermetically sealed at two spaced points by the plastic material therein and a suction connection into said sealed portion, of a positively driven intermediate feeding mechanism between said pug mill and said auger machine, said pug mill discharging into said intermediate feeding mechanism, said intermediate feeding mechanism discharging into said hermetically sealed portion of the auger machine, said intermediate feeding mechanism having means for feeding and compacting the plastic material into the discharge side thereof sufficiently to maintain a hermetic seal by the plastic material while feeding the plastic material through said seal into the auger machine.

5. The combination with a pug mill for working plastic material and an auger machine comprising a barrel having a die chamber at one end and an auger journaled for rotation therein and arranged to receive and extrude the plastic material pugged by said mill through said die chamber, a portion of said auger machine being hermetically sealed at two spaced points by the plastic material therein and a suction connection into said sealed portion, of a positively driven intermediate feeding mechanism between said pug mill and said auger machine, said pug mill discharging into said intermediae feeding mechanism and intermediate feeding means discharging into said hermetically sealed portion of the auger machine, said intermediate feeding mechanism comprising means for intermittently feeding and compacting the plastic material into the discharge side thereof sufficiently to maintain a hermetic seal by the plastic material while feeding the plastic material through said seal into the auger machine.

6. The combination with a pug mill for working plastic material and an auger machine comprising a barrel having a die chamber at one end and an auger journaled for rotation therein and arranged to receive and extrude the plastic material pugged by said mill through said die chamber, a portion of said auger machine being hermetically sealed at two spaced points by the plastic material therein and a suction connection into said sealed portion, of a positively driven intermediate feeding mechanism between said pug mill and said auger machine, said pug mill discharging into said intermediate feeding means, said intermediate feeding means discharging into said hermetically sealed portion of the auger machine, said intermediate feeding mechanism comprising an oscillating member for intermittently feeding and compacting the plastic material into the discharge side thereof sufficiently to maintain a hermetic seal by the plastic material while feeding the plastic material through said seal into the auger machine.

7. The combination with a pug mill for working plastic material and a auger machine comprising a barrel having a die chamber at one end and an auger journaled for rotation therein and arranged to receive and extrude the plastic material pugged by said mill through said die chamber, a portion of said auger machine being hermetically sealed at two spaced points by the plastic material therein and a suction connection into said sealed portion, of a positively driven intermediate feeding mechanism between said pug mill and said auger machine, said pug mill discharging into said intermediate feeding means, said intermediate feeding means discharging into said hermetically sealed portion of the auger machine, said intermediate feeding mechanism having means for feeding and compacting the plastic material into the discharge side thereof sufficiently to maintain a hermetic seal by the plastic material while feeding the plastic material through said seal into the auger machine, and means for varying the amount of material fed by said intermediate feeding means independently of said pug mill and said auger.

8. The combination with a pug mill for working plastic material and an auger machine comprising a barrel having a die chamber at one end, an auger journaled for rotation therein and arranged to receive and extrude the plastic material pugged by said mill through said die and chamber, and a suction connection into said auger machine, of a positively driven intermediate feeding mechanism between said pug mill and said auger machine, said pug mill discharging into said intermediate feeding means, said intermediate feeding mechanism discharging into said auger machine and comprising a hopper positioned to receive the material worked by said pug mill, a mouthpiece hermetically sealed to said auger machine, and arranged to deliver the material into the auger machine, and an oscillating plunger pivoted adjacent one edge thereof and arranged to compact the material in said mouthpiece sufficiently dense to form a hermetic seal thereby and to positively force the plastic material through said seal into the auger machine.

9. The combination with a pug mill for working plastic material and an auger machine comprising a barrel having a die chamber at one end, an auger journaled for rotation therein and arranged to receive and extrude the plastic material pugged by said mill through said die chamber and a suction connection into said auger machine, of a positively driven intermediate feeding mechanism between said pug mill and auger machine, said pug mill discharging into said intermediate feeding means, said intermediate feeding mechanism discharging into said auger machine, and comprising a hopper positioned to receive the material worked by said pug mill, a mouthpiece hermetically sealed to said auger machine and arranged to deliver the material into the auger machine, and an oscillating plunger pivoted at an edge within said hopper and arranged to compact the material in said mouthpiece sufficiently dense to form a hermetic seal thereby and to positively force the plastic material through said seal into the auger machine.

10. The method of evacuating air from plastic materials while continuously extruding the material, consisting in compacting the material to a density sufficient to maintain a hermetic seal but not sufficient to prevent evacuation of air from the material after it has passed through the seal and at a density less than the density of the extruded material to provide a hermetically sealed region between the point of extrusion and the point at which the material is compacted, extracting air from the hermetically sealed region to extract air from the plastic material while intermittently feeding material into the hermetically sealed region through the less dense hermetical seal and controlling the amount of material fed in accordance with the rate of extrusion of the material.

11. The method of evacuating air from plastic material while passing the material through an air extracting zone between a point of extrusion and a seal formed by the plastic material at the entrance to the zone, which comprises compacting the material to a density sufficient to maintain a hermetic seal at the entrance to the zone without compacting it to a density which will prevent evacuation of air from the plastic material after it has passed into the air extracting zone, feeding said material through said seal into said zone, extracting air from said zone to evacuate air from said material and extruding the material from said zone.

12. The method of evacuating air from plastic material while passing the material through an air extracting zone between a seal formed by the plastic material at the entrance to the zone and a point of extrusion, which comprises compacting the material to a density sufficient to maintain a hermetic seal at the entrance to said zone without compacting it to a density which will prevent evacuation of the major portion of the air from the material when the material is partly broken up in the air extracting zone, feeding the material through said seal into said zone, partly breaking up said material in said zone, extracting air from said zone to evacuate air from said material, and extruding the material from said zone.

In witness of the foregoing I affix my signature.

THOMAS F. MOONEY.